Nov. 27, 1945.　　　R. NEUSCHOTZ　　　2,389,737
REMOTE CABLE CONTROL
Filed Dec. 31, 1942　　　5 Sheets-Sheet 1

ROBERT NEUSCHOTZ,
INVENTOR.

BY Hazard & Miller

ATTORNEY.

Nov. 27, 1945.  R. NEUSCHOTZ  2,389,737
REMOTE CABLE CONTROL
Filed Dec. 31, 1942   5 Sheets—Sheet 5

ROBERT NEUSCHOTZ,
INVENTOR.

BY Hazard & Miller

ATTORNEY.

Patented Nov. 27, 1945

2,389,737

UNITED STATES PATENT OFFICE 2,389,737

REMOTE CABLE CONTROL

Robert Neuschotz, Los Angeles, Calif.

Application December 31, 1942, Serial No. 470,903

15 Claims. (Cl. 254—185)

This invention relates to a cable control for operating remotely located devices or mechanisms.

A primary object of the invention is to provide a mechanism including a plurality of drums to each of which a cable is connected and on which a cable is adapted to be wound and to provide means whereby each of the drums may be selectively connected to a rotary shaft so that any drum may be optionally operatively connected to a single operating lever which drives the rotary shaft. In this manner, each of the drums may be selectively rotated by the same operating lever and by consecutive operations and proper selections. Each of the drums may be rotated to wind its cable thereon. The invention has been primarily designed for use in conjunction with machine guns and cannon mounted on aircraft. Such guns may be disposed on the aircraft at locations remote from the pilot's compartment or the cabin, that have spring actuated mechanisms for firing and positioning the cartridges in the firing chamber. These mechanisms are connected by cables to the drums of the device embodying the present invention. In the case of .50 caliber machine guns by winding up the cable of each gun on its respective drum and holding the cable in the wound position the cartridge is held in a position withdrawn from the firing chamber and the gun is thus maintained in a safe condition wherein it is impossible to fire the gun either by accident or inadvertence and as the cartridge is held out of the firing chamber there is no danger of "cooking off" wherein the heat of the firing chamber is sufficient to cause the cartridge to self-explode. In the case of 20 mm. cannon, the mechanism of the cannon is such that it is necessary to wind up the cable connected thereto on the drum and then release it.

By means of the present construction consecutive operations of the operating lever can be caused to consecutively wind the cable of each machine gun on its respective drum to place the gun in safe condition and retained in this condition until it is desired to release the cable to place the gun in firing condition. When the invention is employed in conjunction with cannon there is no occasion for retaining the cable in wound up condition as in the case of .50 caliber machine guns, but the mechanism embodying the present invention is advantageous in facilitating the consecutive operations of the cables of each cannon by means of the same operating handle.

It will, of course, be understood that although the present invention has been primarily designed for use in conjunction with machine guns and cannon installed on aircraft that it may be advantageously employed under any circumstances wherein there is a plurality of cables or tension elements leading to devices or mechanisms that are remotely located and it is desired to wind up the cables selectively on their respective drums by means of a single operating lever and permit them to unwind therefrom either immediately as in the case of 20 mm. cannon or after the cable has been retained in wound up condition as in the case of .50 caliber machine guns.

With the foregoing and other objects in view, which will be made manifest in the following detailed description and specifically pointed out in the appended claims, reference is had to the accompanying drawings for an illustrative embodiment of the invention, wherein:

Referring to the accompanying drawings wherein similar reference characters designate similar parts throughout, Figs. 1 to 9 inclusive illustrate a mechanism embodying the invention that has been designed for use in conjunction with fifty caliber machine guns and the like wherein each cable after having been wound on its drum is retained in wound up condition until such time as it is desired to release it. The invention will, therefore, be primarily described in conjunction with the requirements of this type of gun.

The mechanism illustrated in these figures comprises a housing the body of which is indicated at 10 and which is equipped with lugs or ears 11 through which attaching bolts 12 extend for mounting the housing on a suitable support 13 which in the case of aircraft may be a support or a wall in the pilot's compartment. The housing 10 is equipped with a side cover 14 attached to the body, such as by bolts or screws 15. It is also equipped with a rear cover 16 attached to the body such as by bolts or screws 17. A stud shaft 18 is threaded into the cover 14, as indicated at 19, and this stud shaft 18 serves to rotatably mount the hub 20 of an operating lever 21 that is equipped with a handle 22. The lever is detachably mounted on the hub by means of a screw or bolt 23. In the hub there is formed an annular recess 24 that accommodates a torsion spring 25, one end of which, indicated at 26, is anchored in a drilled hole in the hub. The other end of the torsion spring 27 is anchored in a hole in a circular disc 28 which is connected to a ring 29 that fits about the outer end of the shaft 18. The outer end of the shaft 18 is threaded and flatted on its underside as indicated at 30, and as the interior of the ring 29 is formed complementary to the flatted portion 30, the ring 29 is held against rotation or is effectively keyed to the shaft 18.

A plurality of threaded holes are formed in the ring 29 any of which may receive a screw 31. A plurality of countersunk holes are also formed in the disc 28 any of which may receive the screw 31. Usually there are four holes in the ring 29 and three holes in the disc 28. Any of these holes in the disc and ring may be brought into registration to receive the screw 31 and by the proper selection the torsion of the spring 25 may be varied or adjusted. A nut 32 is threaded onto the outer end of the shaft 18 and holds the ring 29 and the disc 28 tightly against the shoulder upon the shaft. The function of the torsion spring 25 is to always urge the operating lever 21 into a normal forward position somewhat more forwardly than that illustrated in Fig. 1, or in other words, into the normal position shown in Fig. 2. On the back of the hub 20 of the operating lever there is secured a gear segment 33 which meshes with a pinion 34 that is keyed to the rotary shaft 35. The ends of this rotary shaft are mounted in suitable anti-friction bearings 36.

A plurality of drums are mounted on the rotary shaft 35 so as to be free to rotate thereon and as illustrated, these drums are four in number, there being one drum to accommodate each of the four cables 37. It will of course be appreciated that the invention is in no way restricted to the use of four cables and consequently four drums. Any number of cables and drums respectively may be employed. While the details of construction of each of these drums may also vary the drums as illustrated comprise a relatively thick center plate 38 and two side plates 39 and 40. The plates that comprise each drum 38, 39, and 40 are fastened together by rivets 41 and the plates are so formed as to accommodate anti-friction bearings 42 that are disposed between the drums and the rotary shaft 35. The center plate 38 has a slot 43 cut therein the inner end of which is enlarged as at 44, see Fig. 4. The enlarged portion of the slot accommodates a sleeve or anchor 45 in which the end of the cable 37 is anchored. Whenever a drum is rotated by means of the shaft 35 the cable 37 is wound on the peripheral surface 46 of the thick center plate 38 being effectively guided and retained thereon by the side plates 39 and 40. While the peripheral surface 46 can in many instances be circular in form, I have illustrated it in Fig. 4 as being somewhat cam shaped.

Figures 4, 5, 6:
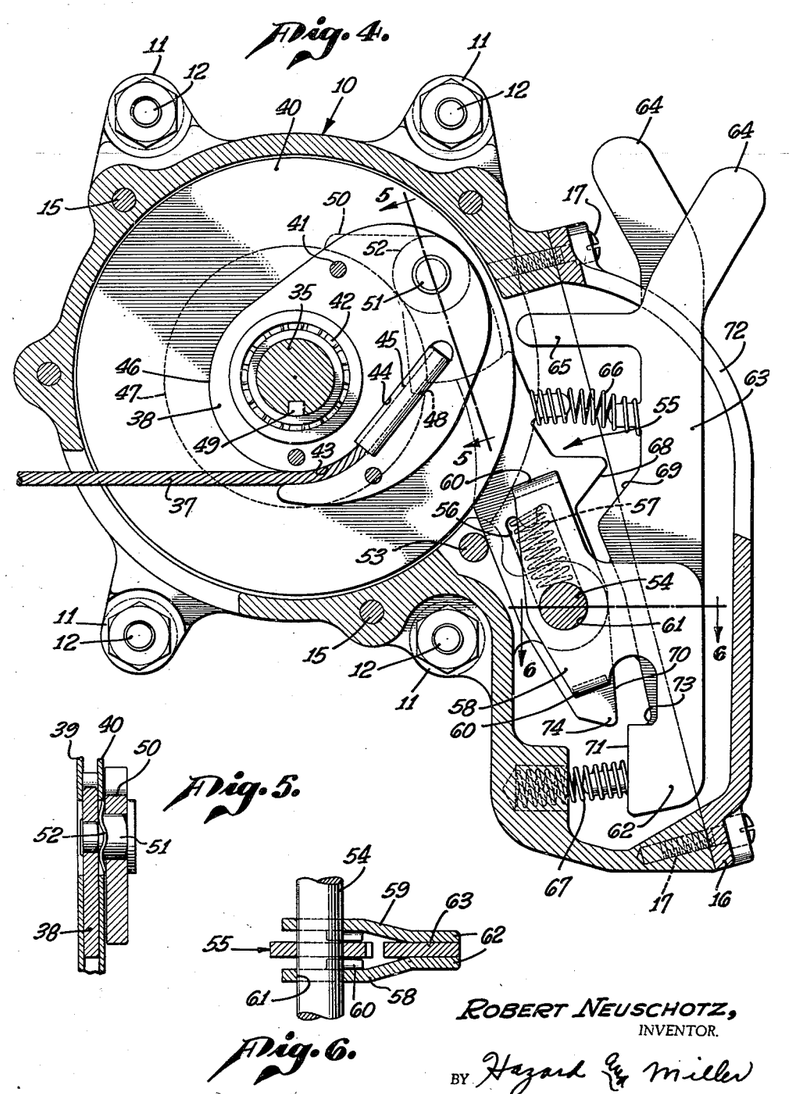
Fig. 4 is a sectional view taken substantially upon the line 4—4 upon Fig. 3 in the direction indicated.
Figs. 5 and 6 are partial views in section taken upon the lines 5—5 and 6—6, respectively, on Fig. 4 in the direction indicated.
Figure 7:
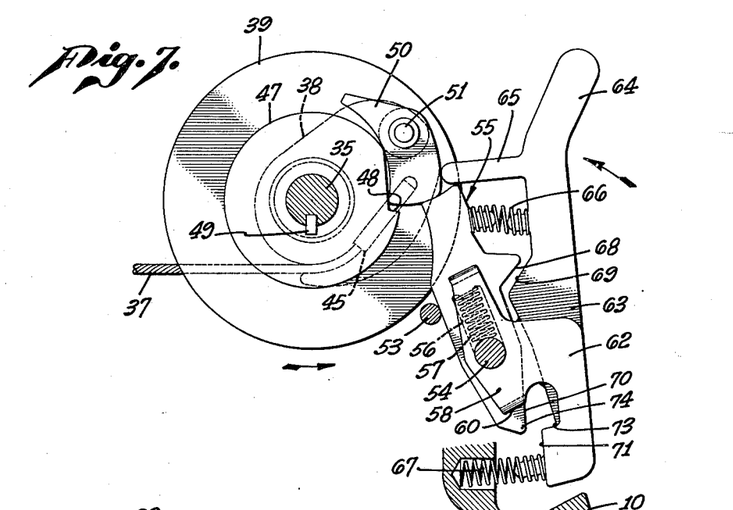
Fig. 7 is a partial schematic view of parts illustrated in Fig. 4, illustrating these parts in that position after a particular drum has been selected to operatively connect it to the rotary shaft and consequently to the operating lever and prior to the operation of the operating lever which causes the cable to be wound thereon.

The reason for the peculiar shape illustrated in Fig. 4 is due to the unusual conditions existing in connection with fifty caliber machine guns. In such machine guns now in general use the spring mechanism of the gun is such that during the initial quarter of its retracting movement the tension that must be applied to its cable is quite high. A typical gun requires an initial tension of approximately 75 pounds to start its retracting movement and the tension quickly rises from this initial tension to a tension of approximately 110 pounds during the first quarter of the retracting movement. At the end of approximately the first quarter of the retracting movement the tension that must be imposed by the cable suddenly drops to approximately 25 pounds and remains at this figure for approximately throughout the second quarter of the retracting movement. At the beginning of the third quarter of the retracting movement the tension that must be applied by the cable suddenly rises to approximately forty-five pounds and throughout the entire last half of the retracting movement the tension gradually but continually increases to approximately 75 pounds. By having the peripheral surface 46 of the thick center plate 38, shaped as illustrated it would be noted that during the initial rotation of this plate in a counterclockwise direction as viewed in Fig. 4, that the cable winds on a portion of the peripheral surface 46 that is located rather close to the axis of rotation of the shaft 35. In other words, the peripheral surface 46 during the initial quarter revolution of the drum from the position shown in Fig. 4 has a short radius from the center of rotation of the shaft 35. Therefore, during the first quarter revolution when the tension on the cable is quite high this short radial distance provides for great mechanical advantage to compensate for the high tension that is required. During the second quarter of the revolution of the plate 38 as illustrated in Fig. 4, the cable 37 winds against that portion of the peripheral surface 46 that is more remotely located from the axis of rotation of the shaft 35. Consequently, during the second quarter of the revolution of the drum when the tension on the cable 37 is relatively low the mechanical advantage available is correspondingly less. During the last half of the revolution of the plate 37 the cable 38 winds against a portion of the peripheral surface 46 that is fairly remote from the axis of rotation of shaft 35 but this portion of the peripheral surface continually nears or approaches the axis of rotation so that throughout this latter half of the revolution there is a constantly increasing mechanical advantage to compensate for the constantly increasing tension that must be applied to the cable 37 during the last half of the retracting movement of the mechanism of the gun. In this manner, although the loads that must be applied to the cables 37 during the winding operation may vary considerably if the plate 38 is properly formed these varying loads may be compensated for whereby the pull on the handle 22 of the operating lever 21 may be smoothed down to a relatively even pull. In other situations wherein the load on the cable 37 is practically constant throughout its winding movement it will be appreciated that the peripheral surface 46 of the plate 38 should approach a circle in form.

On one side of each drum there is positioned a single toothed ratchet 47, the single tooth of which is indicated at 48. This tooth faces in a counterclockwise direction as viewed in Figs. 4, 7, 8, and 9. The remainder of the peripheral surface of this ratchet largely comes to a circle. Each ratchet is mounted on the shaft 35 and is keyed thereon by means of a key 49. On the outer side of each plate 40 of each of the drums there is disposed a pawl 50 engageable with the tooth 48. Each pawl is pivotally mounted on a suitable stud 51 extending through the plate 40 and through the thick center plate 38. A corrugated spring washer 52 surrounds the stud 51 and is housed within a large aperture formed in the plate 40. This spring washer bears against the side of the plate 38 and against the inner face of the pawl 50. It serves to hold the pawl 50 frictionally in any position to which the pawl may have been moved.

Figure 1:
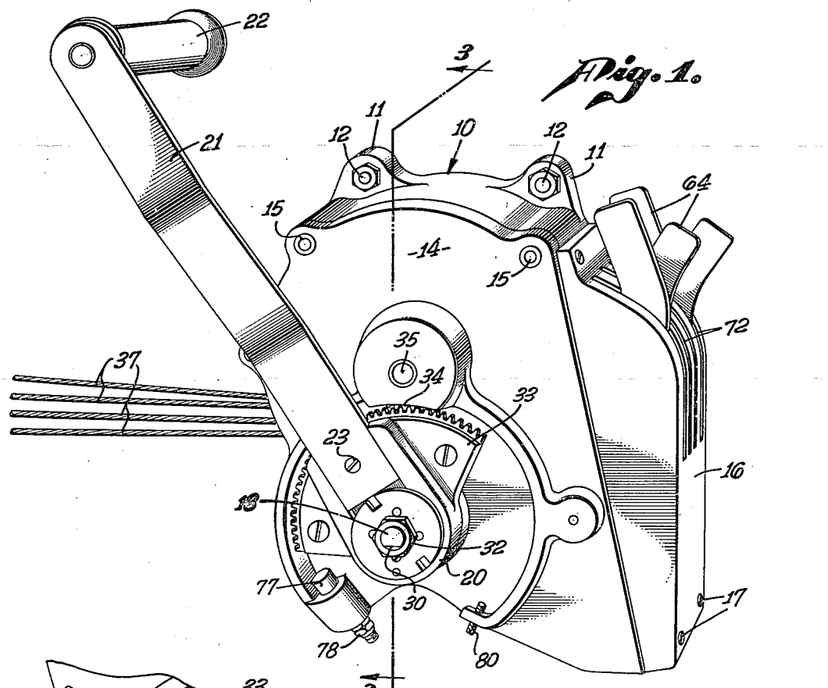
Figure 1 is a perspective view of the mechanism embodying the present invention the cables being illustrated as four in number and leading from the mechanism to the remotely located devices which may be machine guns, not shown, the operating handle being illustrated in that position wherein it has partially moved through its operating stroke.

A stationary rod or shaft 53 extends transversely through the housing and a second stationary shaft or rod 54 extends transversely through the housing somewhat below and rearwardly of the rod 53. On the second shaft 54 which constitutes a rocker or detent shaft there are disposed four rockers or detents, generally indicated at 55. These rockers or detents have slots 56 formed therein through which the rocker or detent shaft 54 extends. These slots enable the rockers or detents to pivot on and to slide relatively to the shaft 54. Compression springs 57 are disposed in the slots 56 urging the rockers or detents 55 into uppermost positions or in other words, in that position illustrated in Fig. 4. Forward swinging movement of the rockers or detents is limited by their engagement with the transverse rod 53. The rockers or detents 55 are arranged in longitudinal alignment with their respective pawls 50 so as to be engageable thereby. Each rocker 55 is slidably disposed between its side plates 58 and 59, see Fig. 6. These side plates are disposed in spaced relation to the sides of the rockers 55 except for the top and bottom ends thereof. These ends are bent inwardly as at 60 so as to slidably engage the sides of the rockers. The side plates cooperate to form a housing for each of the springs 57 and are apertured as at 61 so that these side plates are pivoted upon the shaft 54. The side plates are equipped with extensions 62 that are spot welded or otherwise secured to the sides of the selector levers 63. The selector levers have handles 64 some of which are bent rearwardly and others of which are bent forwardly in an alternate manner as illustrated in Fig. 1. The handles may also have different lengths facilitating their identification and selection with their respective drums and consequently with their respective cables.

The selector levers have forwardly extending fingers 65 which are engageable with their pawls 50. Compression springs 66 are seated on the forward sides of the selector levers and on the rear edges of the rockers or detents 55 above shaft 54. Compression springs 67 are seated between the forward sides of the selector levers and a wall of the housing below the shaft 54. The upper springs 66 are relatively limber and consequently urge the detents or rockers 55, gently but firmly into their foremost positions against the stationary rod 53. The lower springs 67 are relatively stiff and they are of such a length and are so formed that when the selector levers are in the normal position illustrated in Fig. 4 they exert no noticeable pressure on the selector levers. Detents 55 and their respective selector levers 63 are disposed in longitudinal alignment between the side plates 58 and 59. The detents 55 and the selector levers 63 are so formed as to present complementary mutually engageable surfaces at 68, 69, 70, and 71. Edge 68 is enagageable with edge 69 on the selector lever whenever the detent 55 is forced downwardly and rearwardly compressing spring 57. Whenever these edges 68 and 69 are in engagement edges 70 and 71 will also be engaged so as to lock the rocker or detent 55 against movement relative to its respective selector lever. In the normal position however, as illustrated in Fig. 4, wherein the detent 55 is held in its uppermost position by its compression spring 57 the detent or rocker can pivot and move relatively to its respective selector lever 63. As illustrated in Figs. 1 and 4, the rear cover 16 is slotted as at 72 to accommodate the projecting portions of the selector levers.

In the bottom of each selector lever there is formed a notch 73 shaped to accommodate and receive the nose 74 on the bottom of its detent 55. The side plates 58 and 59 are shaped somewhat to conform to this notch.

In the bottom of the side cover 14 there is formed a recess 75 which accommodates a compression spring 76 of a spring actuated bumper 77. The normal position of this bumper is adjusted by means of jamb nuts 78.

Figure 2:
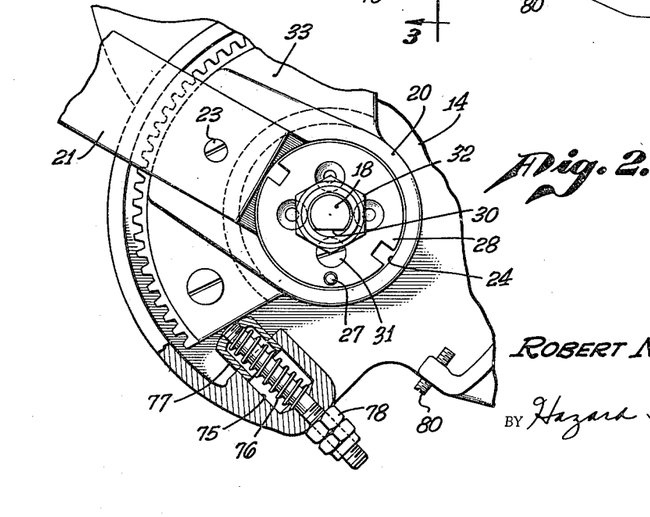
Fig. 2 is a partial view in side elevation of a portion of the mechanism shown in Fig. 1, parts being broken away and shown in vertical section, the portion of the operating lever illustrated being shown in its normal or released position.
Figure 3:
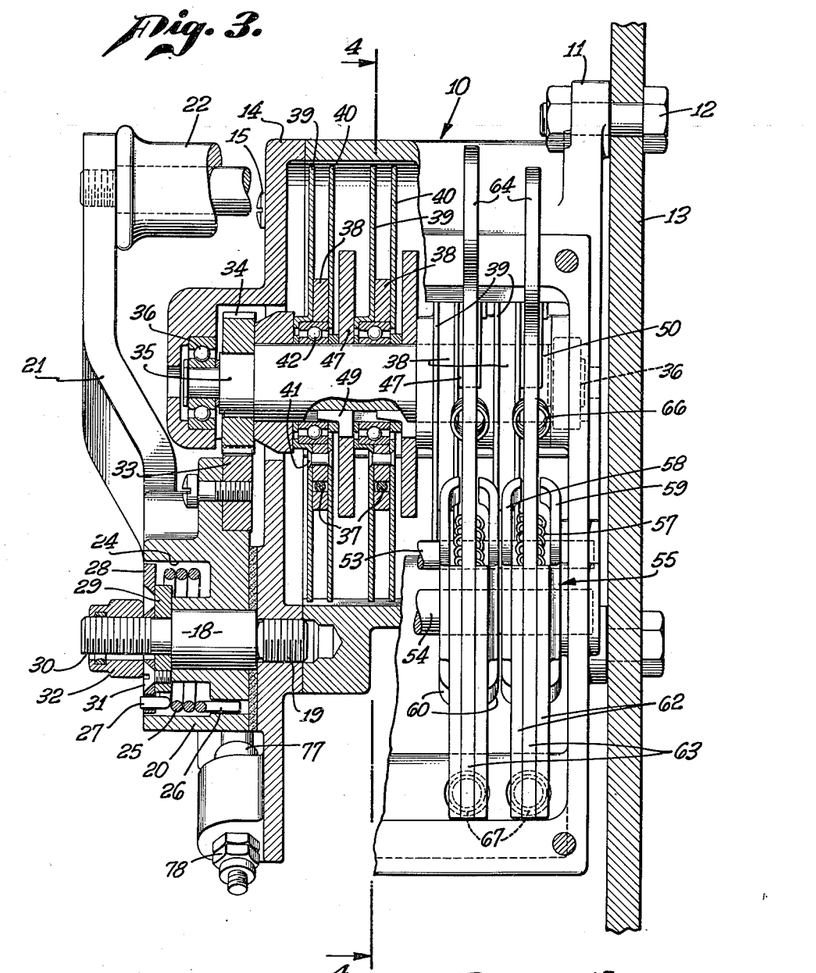
Fig. 3 is a view in rear elevation of the mechanism shown in Fig. 1, the rear cover being shown as having been removed and parts being broken away and shown in vertical section, the sectional portion being taken substantially upon the line 3—3 upon Fig. 1.

The operation of the mechanism as above described is as follows: Assuming that the mechanism is originally in its normal position wherein the operating lever 21 is in a position resting against the bumper 77 as illustrated in Fig. 2 and it is desired to wind up one of the cables 37, the selector lever 63 that is associated with that cable is pushed forwardly compressing the compression spring 66 causing the finger 65 to engage the pawl 50 and shift it from the position shown in Fig. 4 to the position shown in Fig. 7. Detent 55 is of course held against being moved by the compression of spring 66 by reason of its engagement with the rod 53. The spring washer 52 frictionally retains the pawl 50 in the position to which it has been moved by the finger 65 and in this position the pawl 50 is engageable by the tooth or shoulder 48. After the selector lever 63 has been pushed forwardly to shift the position of its pawl 50 it may be released and the compression of spring 66 serves to return the selector lever to its normal position as shown in Fig. 4.

Figure 8:
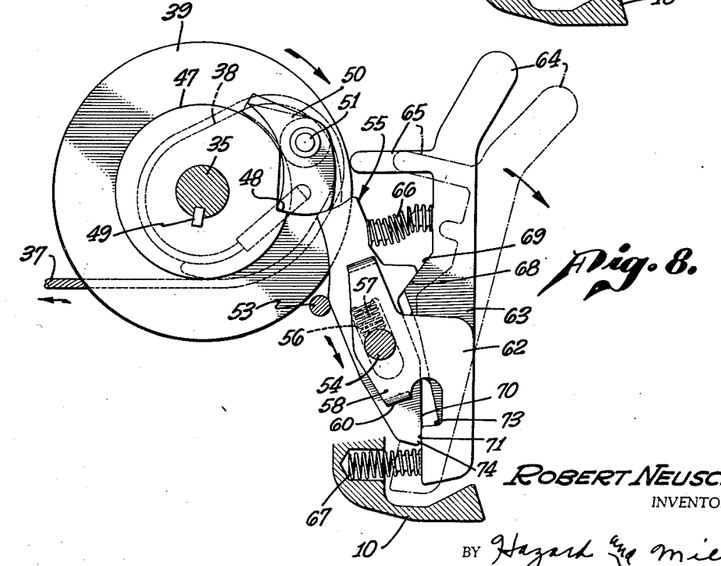
Fig. 8 is a view similar to Fig. 7, but illustrating the parts in that position after the winding of the cable on the drum has been completed.
Figure 9:
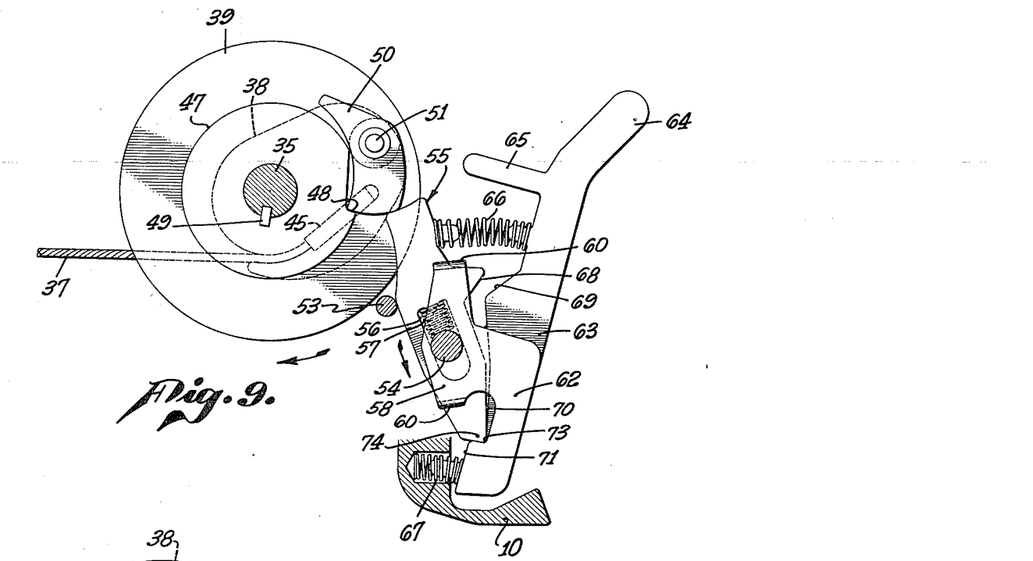
Fig. 9 is a view similar to Fig. 7, but illustrating the parts in that position assumed by them at the end of the unwinding operation of the cable from the drum.

Handle 22 is then pulled rearwardly rotating the gear segment 33 and producing rotation of shaft 35. Rotation of shaft 35 causes all of the cams 47 thereon to be rotated with the shaft and in a counterclockwise direction as viewed in Fig. 4. That cam whose pawl has been actuated by finger 65 of its selector lever will have its tooth or shoulder 48 engage the pawl, thus locking the drum with the shaft 35 and causing it to rotate with the shaft. The relationship between the pinion 34 and the gear segment 33 is such that a full stroke of the handle 22 will produce slightly more than one complete revolution of the shaft 35. When this rotation of the shaft is completed handle 22 may be released in which case the tension on cable 37 is free to urge the drum in a clockwise direction as viewed in Figs. 4 and 8. Reverse rotation of the drum however is arrested by the pawl 50 engaging the upper end of the detent 55 forcing it downwardly and rearwardly and compressing the spring 57. Such movement of the detent causes edges 68, 69, 70, and 71 to mutually engage as illustrated in Fig. 8, locking the detent 55 against relative movement with respect to its selector lever. As the torsion spring 25 returns the operating lever 21 to its initial position, shaft 35 will of course be reversely rotated and will reversely rotate each of the ratchets 47 which are keyed thereto. As the circular portion of the selected ratchet engages the inner edge of its pawl 50 it forcibly rotates the pawl overcoming the friction of the spring washer 52 and shifts it into the dotted line position shown in Fig. 8. In this position, reverse rotation of the drum is arrested by the detent or rocker 55. The torsion spring 25 thus returns all parts, except those of the selected drum, to normal and the selector lever of another cable may then be pushed forwardly to have its finger engage its pawl and move it into a position to be engageable by its ratchet. The operation can then be repeated with the second selected drum to wind up its cable thereon without in any way disturbing the wound up cable on the first selected drum. In a similar manner, the third and fourth cables can be wound up on their respective drums by consecutive operations which include the operation of the same operating lever 21.

As each ratchet is reversely rotated from the wound up position shown in full lines on Fig. 8, the circular surface of the ratchet engages the inside of the pawl and will shift it from the full line position shown in Fig. 8 to the dotted line position shown therein.

When it is desired to release any or all of the drums to permit the cables to unwind therefrom the selector levers are either simultaneously or selectively swung rearwardly into the dotted line position shown in Fig. 8. Rearward movement of any selected levers causes its respective rocker or detent 55 to be swung in unison therewith because of the engagement of the mutually engagement edges 68, 69, 70, and 71. As these detents or rockers are swung rearwardly about shaft 54 as a center they disengage their respective pawls 50 and allow the drums to be reversely rotated under the tensions imposed by their respective cables 37. As the detents 55 are swung outwardly by the selector levers the pawls are held against outwardly swinging movement therewith because of their engagement with the circular surfaces of the ratchets, see the dotted line position shown in Fig. 8. When any drum is thus released for unwinding the unwinding or reverse rotation of the drum takes place very quickly. Invariably the drum makes its complete reverse revolution while the selector lever is still retained in the dotted line position shown in Fig. 8. As soon as the pawl 50 is released by the detent the spring 57 is immediately effective to lift the detent to its original position, but as the selector lever is retained in the dotted line position shown in Fig. 8 or the full line position shown in Fig. 9, this elevation of the detent causes its nose 74 to enter the notch 73. Upon completion of the reverse rotation of the drum the pawl 50 encounters the top of the detent usually with considerable force and velocity due to the fact that the drums are free to rotate on the shaft 35 and tend to overrun. The detent immediately arrests reverse rotation of the drum at the completion of the reverse revolution and the impact, although it may be slightly absorbed by the spring 57 is mainly taken by the selector lever which backs or braces the detent by the engagement of the nose 74 in the notch 73. If the selector lever is then released spring 67 then returns to normal position as shown in Fig. 4.

A feature of the invention resides in the ability to clear the mechanism and return it to normal in the event that a particular selector lever has been pushed forwardly accidentally or by inadvertence or if two or more selector levers have been simultaneously pushed forwardly. If one or more selector levers have been pushed forwardly and it is not desired to go through a cycle of operation of the mechanism which might be impossible if two or more selector levers have been simultaneously moved forwardly on account of the excessive load it is possible to clear the mechanism and return all parts to normal. This is accomplished in the following manner: Assuming that a selector lever has been pushed forwardly to cause its finger 65 to engage its pawl 50 and move this pawl into the path of the tooth 48 and it is desired to withdraw the pawl from this position the handle 22 is pushed forwardly from the position shown in Fig. 2. This forward movement causes a depressing of the plunger or bumper 77 against the action of its spring 76 and brings about a reverse rotation of the shaft 35. Reverse rotation of the shaft 35 will of course cause all ratchets to move in a clockwise direction for a short distance from the position shown in Fig. 4. This brings the circular portion of each ratchet into engagement with the inside surface of the pawl 50 below the stud 51 and such engagement causes each pawl that may have been moved by its selector lever to be returned to the position shown in Fig. 4. In this manner, regardless of whether one or more selector levers have been accidentally or inadvertently moved forwardly the entire mechanism can be instantly cleared and returned to starting position by the forcing of the handle 22 in a forward direction for a short distance.

Figure 10:
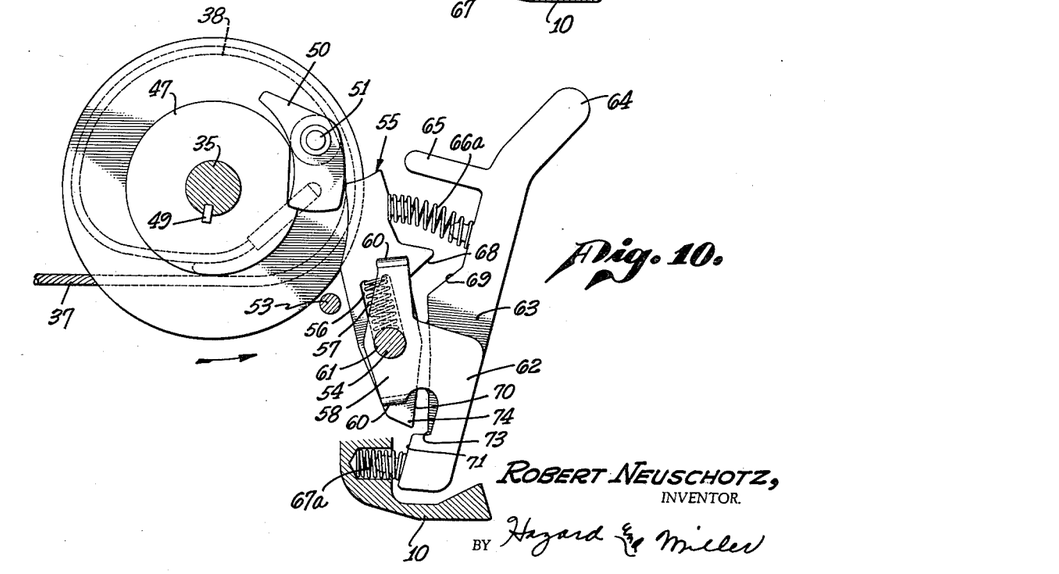
Fig. 10 is a view similar to Fig. 8, but illustrating a slightly modified form of construction which renders it suitable for use in conjunction with such devices as 20 mm. cannon.

In Fig. 10, a slightly modified form of construction is shown which has been designed for use in conjunction with 20 mm. cannon. In the case of 20 mm. cannon there is no occasion to wind up the cable on a drum and retain it in wound up position for any length of time. All that is necessary is to wind up the cable a sufficient distance and to immediately release it. The present mechanism lends itself admirably for use in conjunction therewith with slight modification, as is illustrated in Fig. 10.

In Fig. 10 the peripheral surface of the thick center plate 38 is given a size and shape as indicated in dotted lines on this figure. This shape is permissible with 20 mm. cannon due to the fact that the load on the cable throughout the length of stroke is much more constant than in the case of .50 caliber machine guns. The length of the peripheral surface on the plate 38 is slightly in excess of the length of stroke of the cable so that the complete movement of the cable takes place in slightly less than one complete revolution of the drum. Fig. 10 illustrates the cable as having been completely wound on the drum and as will be noted therein, the pawl 50 has not reached a position where it lockingly engages the detent 55. When the drum has reached its position the handle 22 is released in the normal operation allowing the drum to immediately unwind. In this form of construction spring 67a, which corresponds to spring 67, is made somewhat shorter than spring 67 and if necessary spring 66a, which corresponds to spring 66, may be made somewhat longer than spring 66 so that the selected lever will assume a normal or released position as shown in Fig. 10, wherein the nose 74 on the detent is directly opposite the notch 73. Consequently, when the drum unwinds and tends to overrun the pawl 50 on engaging the detent at the end of the unwinding revolution, is arrested and as the detent is backed or braced by the selector lever the impact of the pawl will not be carried solely by the spring 57.

There may be occasions in connection with a 20 mm. cannon to wind up the cable and hold it in wound up position. Usually the cable is equipped with a turn-buckle or an equivalent adjusting device. By loosening or backing off the turn-buckle sufficiently it is possible to wind up the cable on the drum to such an extent that the pawl will lockingly engage the detent and hold the drum in wound up position. When this is done the pawl on passing over the top of the detent allows the detent to swing forwardly into engagement with the stop shaft 53 which causes the nose 74 to swing backwardly into the notch 73. When the pawl is pushed against the detent the nose 74 of course engages the notch 73 so that the construction is in a position similar to that illustrated in Fig. 9. When it is desired to release the drum under these circumstances the selector lever must first be pushed forwardly to move the nose 74 out of the notch 73 and cause the detent to assume a position as illustrated in Fig. 8. The selector lever can then be moved rearwardly which will cause the detent to move in unison with it and to disengage the pawl. It will be understood, however, that in the normal operation of the construction illustrated in Fig. 10 when used with 20 mm. cannon that the pawl does not lockingly engage the detent at all. Locking engagement is only employed when there is occasion to do repair or adjustment work on or adjacent the cannon and the turn-buckle in the cable or other adjustment device is loosened for this purpose.

In many instances it is desirable to limit rotary movement of the drums to less than one complete revolution and in so doing to form a positive stop therefor. To this end the gear guard 79 on the side cover 14 which guards the gear segment 33 may be provided with a set screw 80 that can be adjusted and which will be engageable by the gear segment to limit the rearward movement of the handle 22.

From the above-described construction it will be appreciated that the mechanism embodying the present invention is composed of parts most of which may be inexpensively constructed. Many of these parts are in the nature of stampings and all parts may be readily assembled together and when assembled form a compact unit. In the event that the cable during its winding operation has varying loadings imposed thereon it is possible to compensate for these loads by properly shaping the peripheral surface of the plate 38 so that the pull applied to the handle 22 is practically steady. On the other hand, if the load imposed on the cable is practically constant the peripheral surface of the plate 38 may be shaped to conform thereto, such as is illustrated in Fig. 10.

Various changes may be made in the details of construction without departing from the spirit or scope of the invention as defined by the appended claims.

I claim:

1. A device of the class described comprising a rotary shaft, means for rotating the shaft, a plurality of drums loose on the shaft, a ratchet for each drum keyed to the shaft, a pawl on each drum engageable with its ratchet, and means for selectively causing any pawl to engage its ratchet whereby any drum may be caused to rotate with the shaft, and means engageable with the selected pawl for holding its drum in rotated position enabling its ratchet to be reversely rotated with the shaft for operation of a succeeding drum.

2. A device of the class described comprising a rotary shaft, means for rotating the shaft, a plurality of drums loose on the shaft, a ratchet for each drum keyed to the shaft, a pawl on each drum engageable with its ratchet, means for selectively causing any pawl to engage its ratchet whereby any drum may be caused to rotate with the shaft, means engageable with the selected pawl for holding its drum in rotated position enabling its ratchet to be reversely rotated with the shaft to enable operation of another drum, and means for selectively releasing the pawls to enable their drums to unwind.

3. A device of the class described comprising a rotary shaft, means for rotating the shaft, a plurality of drums loose on the shaft, a ratchet for each drum, a pawl on each drum engageable with its respective ratchet, a selector lever for each pawl arranged to cause its pawl to engage its ratchet to cause its drum to rotate with the shaft, and a detent associated with each selector lever engageable by its pawl to hold the drum in rotated position whereby upon movement of the selector lever to disengage the detent and pawl a drum may be released to unwind.

4. A device of the class described comprising a rotary shaft, means for rotating the shaft, a plurality of drums loosely mounted on the shaft, a selector lever for each drum, a detent associated with each selector lever, spring means urging the detent into a predetermined position but enabling the detent to move relatively to the selector lever, a ratchet on the shaft for each drum, a pawl on each drum engageable with the ratchet and with the detent, and means operable by the selector lever for causing the pawl to engage its ratchet whereby its drum may be rotated by the shaft and held in rotated position by the detent and upon movement of the selector lever the pawl may be disengaged from the detent to release the drum and permit it to unwind.

5. A device of the class described comprising a rotary shaft, means for rotating the shaft, a plurality of drums loosely mounted on the shaft, a selector lever for each drum, a rocker shaft on which the selector levers are pivotally mounted, a detent for each selector lever mounted for pivotal and sliding movement on the rocker shaft, a ratchet for each drum keyed to the shaft, a pawl on each drum engageable with its ratchet and with the detent, and means on each selector lever for forcing its pawl into engagement with its ratchet whereby its drum may be rotated by the shaft and held in rotated position by the detent and upon movement of the selector lever its pawl may be disengaged from its detent.

6. A device of the class described comprising a rotary shaft, means for rotating the shaft, a plurality of drums loosely mounted on the shaft, a selector lever for each drum, a rocker shaft on which the selector levers are pivotally mounted, a detent for each selector lever mounted for pivotal and sliding movement on the rocker shaft, a ratchet for each drum keyed to the shaft, a pawl on each drum engageable with its ratchet and with the detent, and means on each selector lever for forcing its pawl into engagement with its ratchet whereby its drum may be rotated by the shaft and held in rotated position by the detent and upon movement of the selector lever its pawl may be disengaged from its detent, each selector lever and each detent being so arranged as to mutually engage and be locked against relative rotary movement when the detent is engaged by the pawl after the drum has been rotated.

7. In a device of the class described, a rotary shaft, means for rotating the shaft, a drum loosely mounted thereon, a ratchet keyed to the shaft, a pawl on the drum engageable with the ratchet whereby the drum may be rotated by the shaft, a detent engageable by the pawl, and a selector lever having means for forcing the pawl into engagement with the ratchet, and means for moving the detent out of engagement with the pawl.

8. In a device of the class described, a rotary shaft, means for rotating the shaft, a drum loosely mounted on the shaft, a selector lever, a rocker shaft on which the selector lever is pivotally mounted, a detent arranged to pivot upon and to slide relatively to the rocker shaft, said selector lever and detent having mutually engageable surfaces on opposite sides of the rocker shaft for locking the detent against rotary movement relatively to the selector lever when the detent is shifted from a normal position on the rocker shaft, spring means urging the detent into the normal position, a ratchet keyed to the shaft, a pawl on the drum engageable with the ratchet and with the detent, and means for moving the pawl into engagement with the ratchet.

9. A device of the class described, comprising a housing, an operating lever pivotally mounted upon the housing, a rotary shaft rotatably mounted on the housing, means operatively connecting the operating lever to the rotary shaft so that it may be rotated thereby, spring means urging the operating lever into a normal position, a plurality of drums loosely mounted upon the shaft, a ratchet for each drum, a pawl on each drum engageable with its ratchet, a detent for each drum engageable by its pawl, and means for moving the pawl into engagement with its ratchet and moving the detent out of engagement with its pawl whereby each drum may be independently rotated into a wound up position by the operating lever and retained in such position by the detent and selectively released to unwind on the rotary shaft.

10. A device of the class described comprising a housing, an operating lever pivotally mounted upon the housing, a rotary shaft rotatably mounted on the housing, means operatively connecting the operating lever to the rotary shaft so that it may be rotated thereby, spring means urging the operating lever into a normal position, a plurality of drums loosely mounted upon the shaft, a ratchet for each drum, a pawl on each drum engageable with its ratchet, a detent for each drum engageable by its pawl, and a selector lever relatively to which the detent is slidable, said selector lever being adapted to lock the detent against rotary movement relatively thereto when the detent is moved from a normal position, spring means for urging the detent into normal position, and a finger on the selector lever engageable with the pawl for causing it to engage the ratchet whereby each drum may be independently rotated by the operating lever into a wound up position, retained therein, and subsequently released.

11. A device of the class described comprising a rotary shaft, means for rotating the shaft, a plurality of drums loosely mounted on the shaft, spring means urging the shaft into a normal position, a ratchet for each drum keyed to the shaft, a pawl on each drum engageable with the ratchet, means for frictionally holding the pawl in any position to which it is moved, means for moving each pawl into engagement with its ratchet to connect its drum to the shaft to cause it to rotate therewith, means for holding each drum in rotated position and means for causing each drum to be released so as to reversely rotate on the shaft.

12. A device of the class described comprising a rotary shaft, a plurality of drums rotatably mounted upon the shaft, pawls on the drums, a detent for each pawl engageable therewith to hold its drum in initial and set positions, means on the shaft engageable by the pawls for causing their respective drums to rotate therewith, and means for selectively causing the pawls to engage said means.

13. A device of the class described comprising a rotary shaft, a plurality of drums rotatably mounted upon the shaft, pawls on the drums, a detent for each pawl engageable therewith to hold its drum in initial and set positions, means on the shaft engageable by the pawls for causing their respective drums to rotate therewith, means for selectively causing the pawls to engage said means, and means operable by reverse rotation of the shaft relatively to a drum in its initial position for causing its pawl to disengage the first-mentioned means.

14. A device of the class described comprising a rotary shaft, a plurality of drums rotatably mounted upon the shaft, a cable attached to each drum, a pawl on each drum, a detent engageable by the pawl in the initial and set positions of its drum, means on the shaft engageable by the pawl for causing its drum to rotate with the shaft, and means for selectively causing the pawls to engage said means.

15. A device of the class described comprising a rotary shaft, a plurality of drums rotatably mounted upon the shaft, a pawl on each drum, a ratchet for each drum engageable by its pawl and adapted to be rotated by the shaft to forceably rotate the drums, a detent engageable by each pawl, means for selectively moving the pawls into engagement with their respective ratchets, each ratchet presenting a cam surface engageable with its pawl to disengage the pawl from the ratchet on reverse rotation of the shaft relative to a drum in its initial position.

ROBERT NEUSCHOTZ.